United States Patent [19]

Ma

[11] Patent Number: 5,111,026
[45] Date of Patent: May 5, 1992

[54] CONTROL DEVICE AND METHOD FOR AN ELECTRIC RICE COOKER

[76] Inventor: Chun-Ho Ma, 918-41 Daerim-dong, Yeongdeungpo-ku, Seoul, Rep. of Korea

[21] Appl. No.: 475,968

[22] Filed: Feb. 6, 1990

[30] Foreign Application Priority Data

Apr. 1, 1989 [KR] Rep. of Korea ............... 43161989

[51] Int. Cl.$^5$ ............................................. H05B 1/02
[52] U.S. Cl. .................................. 219/492; 219/497; 219/442; 219/505
[58] Field of Search ............. 219/497, 505, 492, 441, 219/442

[56] References Cited

U.S. PATENT DOCUMENTS

| | | | |
|---|---|---|---|
| 4,656,571 | 4/1987 | Umezu | 363/143 |
| 4,935,607 | 6/1990 | Kadwell et al. | 219/497 |
| 4,962,299 | 10/1990 | Duborper et al. | 219/497 |

FOREIGN PATENT DOCUMENTS

| | | | |
|---|---|---|---|
| 2057858 | 4/1981 | United Kingdom | 219/441 |
| 2095860 | 10/1982 | United Kingdom | 219/441 |

Primary Examiner—Mark H. Paschall
Attorney, Agent, or Firm—Finnegan, Henderson, Farabow, Garrett & Dunner

[57] ABSTRACT

A control device of an electric rice cooker in which the temperature and time is precisely controlled for both boiling rice and warming the boiled rice by a program stored in a microprocessor. The control device includes a temperature detector, a boiling heater switch, a warming heater switch, a trigger signal generator, a microprocessor, a mode selector for selecting cooking modes and a voltage detector for detecting 220V or 100V AC power. In the present invention, soaking of rice before boiling, boiling the rice and warming the boiled rice can be performed thoroughly.

10 Claims, 10 Drawing Sheets

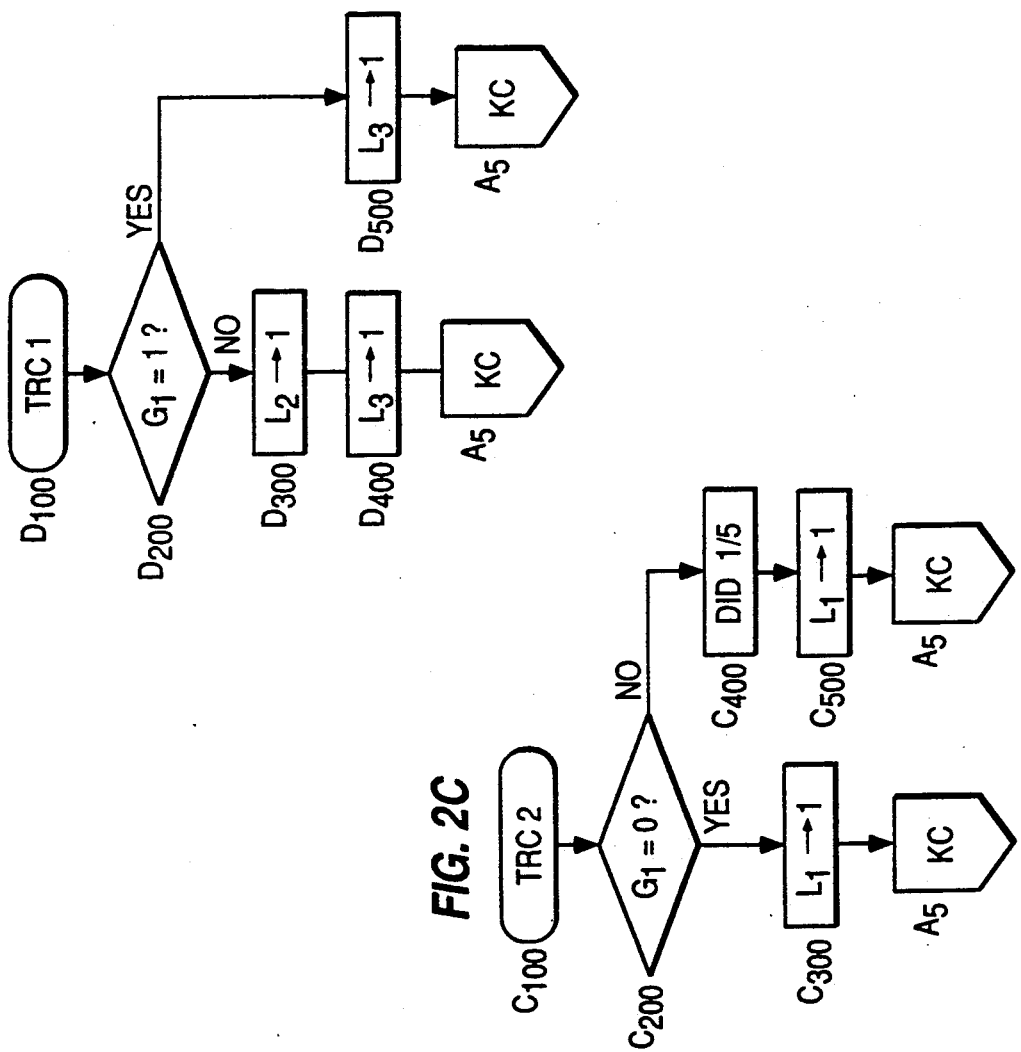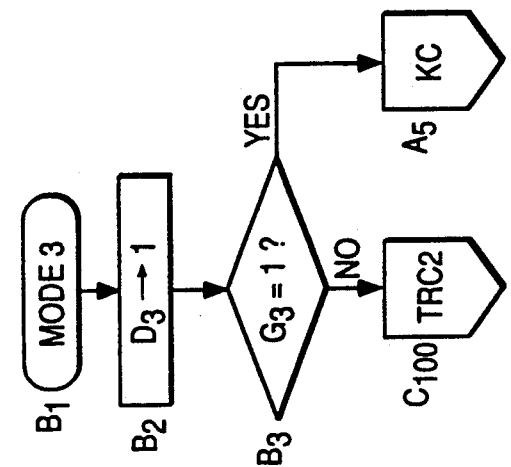

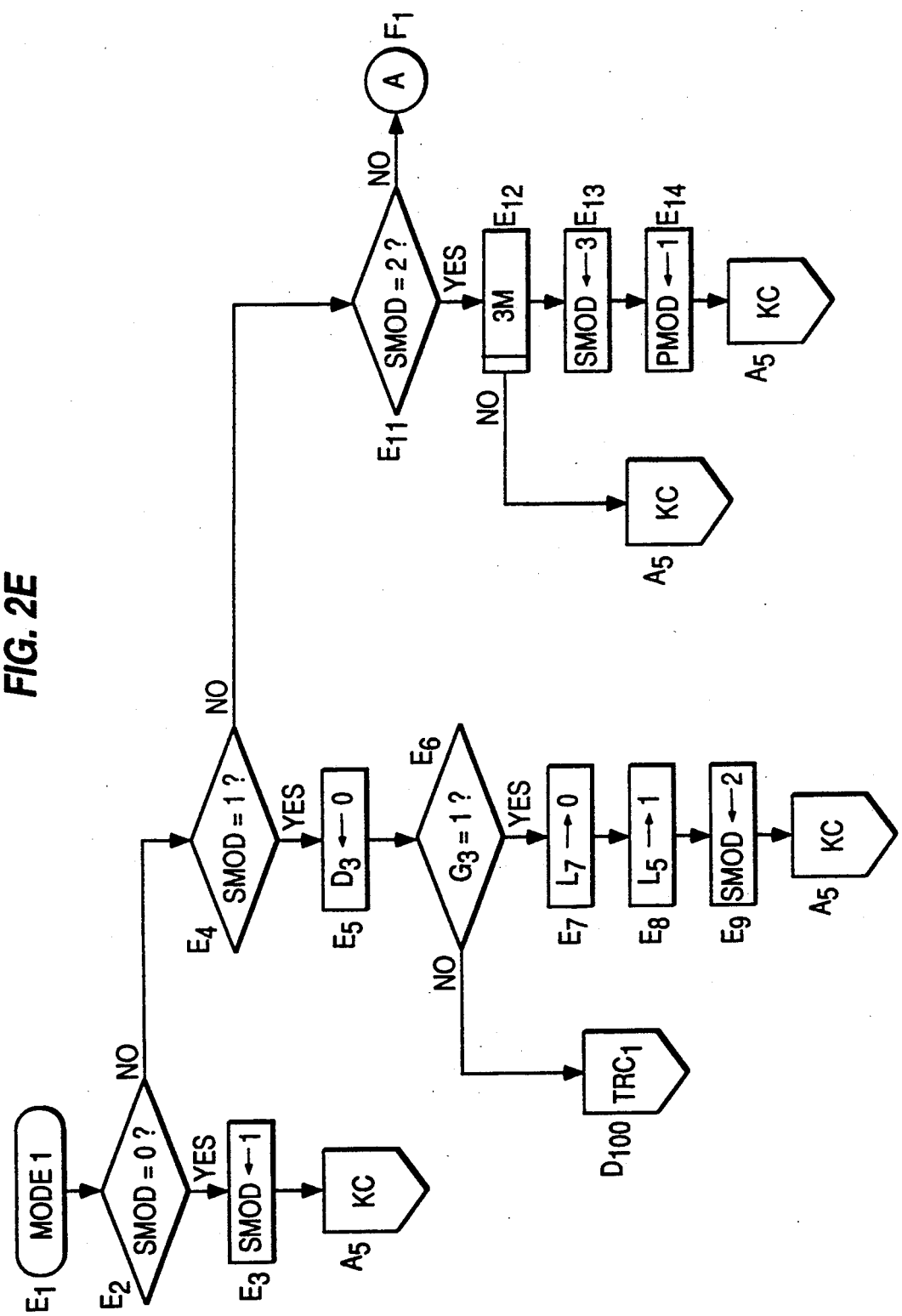

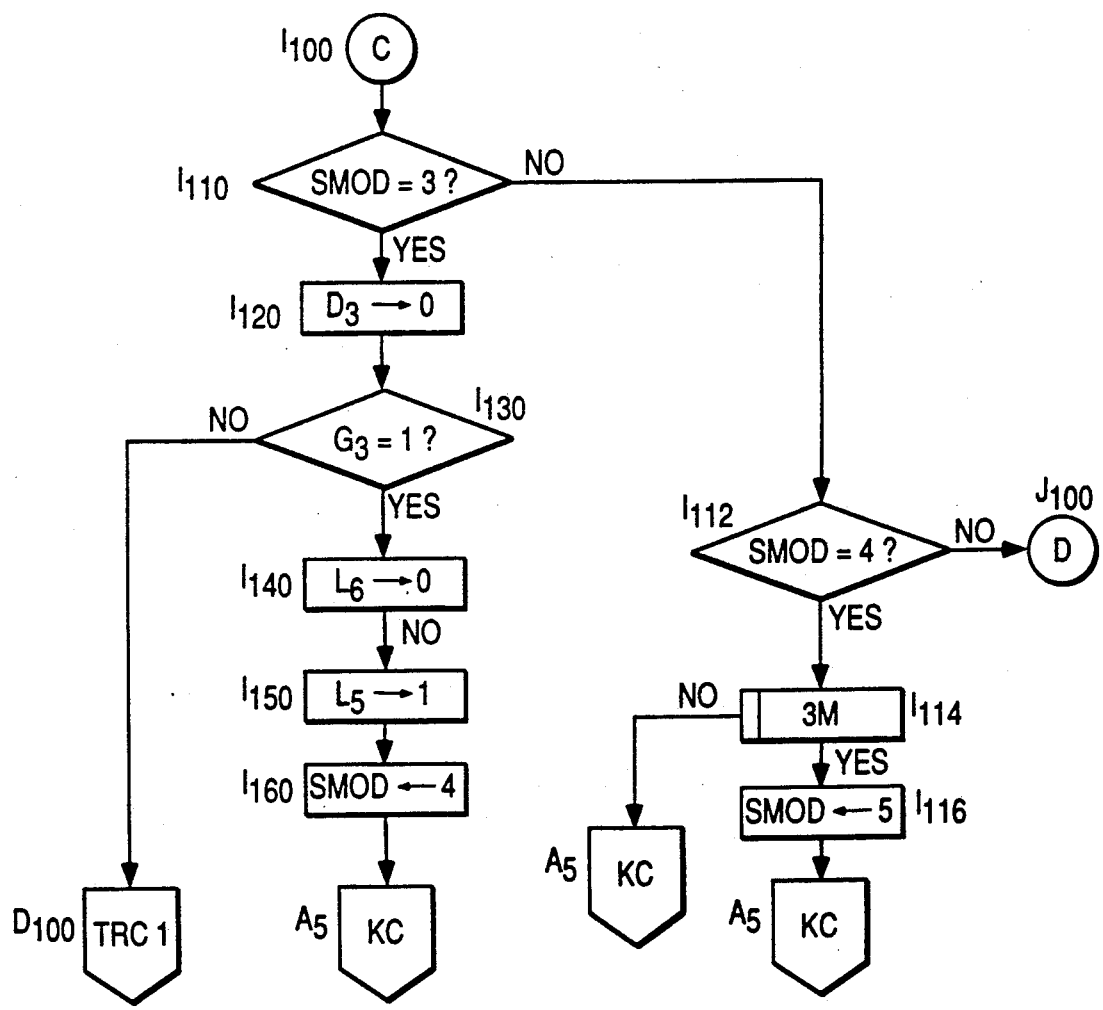

——— TEMPERATURE ----- CONSUMED POWER

CONTROL DEVICE AND METHOD FOR AN ELECTRIC RICE COOKER

BACKGROUND OF THE INVENTION

This invention relates to a control device of electric rice cookers, more particularly to a device that controls precisely the temperature and time for both boiling rice and keeping the cooked rice warm by means of a program stored in a microprocessor. The electric rice cooker, in the present invention, has separate heaters that work in succession with a first boiling heater, a second boiling heater, and a third heater for keeping the cooked rice warm.

Conventional electric rice cookers have a lever for a power switch, which turns on the automatic temperature switch located under the inner pot. This switch connects the boiling heater to AC power.

In the conventional electric rice cookers the temperature of the pot suddenly rises after the rice has been boiled exhausting all of the water in the pot.

When the temperature rises above the Curie point of a ferrite of the automatic temperature switch, the ferrite loses its magnetic characteristics and thus the switch opens. Therefore, the boiling heater is disconnected from AC power causing the temperature inside the inner pot to fall. If this temperature falls down to a temperature predetermined for keeping the inner pot warm, the TRC switch (which is a special switch used for keeping the pot warm) automatically shuts off connecting the warming heater to AC power so that the warming heater will keep the inner pot warm at a predetermined temperature.

Thus, conventional electric rice cookers work well only to a certain extent. They automatically disconnect from AC power after the rice is boiled and keep the boiled rice warm at a constant temperature but, because the TRC switch has a high tolerance on its operating temperature, the switch sometimes closes at a temperature higher than the predetermined level. Thus some conventional electric rice cookers become so hot that the rice burns causing the rice to scorch and stick to the bottom of the inner pot.

As well, other electric rice cookers disconnect from power before the rice is boiled properly because the TRC switch opens at a temperature lower than the predetermined level. Conventional electric rice cookers are, for these two reasons, quite unsatisfactory.

The TRC switch used for keeping rice warm has a high tolerance in operating temperature and, therefore, may be activated at a temperature different from the preselected time for warming. This causes the boiled rice in the inner pot to spoil or harden.

Because the automatic temperature switch of the conventional electric rice cookers is activated by a mechanical lever which requires considerable space for installation, the conventional electric rice cookers tend to be very bulky.

In order to achieve good flavor in cooked rice, it is necessary to soak rice in water for some time before boiling, and to steam the boiled rice afterwards. In conventional electric rice cookers, a constant electric power is supplied to the heater of the rice cooker during cooking. Therefore, the rice in the conventional electric rice cookers may be boiled without getting sufficiently soaked before boiling and burned because the rice is not steamed after it is boiled. In order to solve these problems, some conventional electric rice cookers use more than one heater. The heaters are connected with bimetal thermal switches with operating temperatures different from each other.

Also, some of the heaters have a microswitch operated by a lever. When the lever is pressed, the microswitch is turned on and only the heaters connected with the microswitch are connected to AC power. The temperature of the heat generated by the heaters connected with the microswitch alone is low, and the temperature of the inner pot rises slowly only to allow sufficient soaking time for the rice in the pot prior to boiling.

If the temperature of the pot rises to the level at which rice boils, the bimetal thermal switches are activated and AC power is supplied to all the heaters of the electric rice cooker so as to boil the rice in the pot. When the temperature of the inner pot rises abruptly after boiling rice, exhausting all of the water, another bimetal thermal switch is activated so as to change the connection of the heaters, i.e., from a parallel connection to a series connection. The temperature of the heat generated by the changed connection of heaters is low and maintains a constant level suitable for steaming the boiled rice. Thus, these conventional electric rice cookers, indeed, have a function for both soaking the rice in water before boiling and steaming the boiled rice afterwards. But the bimetal thermal switches have a high tolerance in their operating temperature. This high tolerance also contributes to the problems of cooking rice as described above. Furthermore, because conventional electric rice cookers do not have a timer to control their cooking time, both soaking of the rice before boiling or steaming it after boiling are controlled by the temperature of the inner pot alone and can not be performed as thoroughly as desired.

Another problem of conventional rice cookers is that they are operated by only one single sequence. Therefore, it is not possible to boil rice without soaking it first. (At times it is desired to cook rice immediately, skipping, the rice soaking procedure.)

Another problem of conventional electric rice cookers is that they need a special manual switch adaptable to both 100 V and 220 V AC power.

The primary objective of the electric rice cookers in the present invention is to provide a control device which controls the time for soaking rice, controls the time for steaming the boiled rice, and functions exactly at predetermined temperatures.

Another objective of the electric rice cookers in the present invention is to provide a control device which uses both 100 V and 220 V AC power without the necessity of a manually operated switch. Still another objective of electric rice cookers in the present invention is to provide a control device which has two operation modes being defined later.

SUMMARY OF THE PRESENT INVENTION

In accordance with one aspect of the electric rice cookers in the present invention, there is a control device provided which comprises a temperature detecting means for detecting the temperature of the inner pot of the rice cooker, a boiling heater switching means for connecting boiling heaters to AC power, a warming heater switching means for connecting a warming heater to AC power, a trigger signal generating means to generate a trigger signal to trigger said switching means at the time synchronized with a zero-cross point of AC power, and a microprocessor which is connected with each of said means and controls all said means.

In accordance with another aspect of the electric rice cookers in the present invention, there is a control device provided which utilizes both 100 V and 220 V AC power without the necessity of a manually operated switch. A voltage detecting circuit is included to determine whether AC power is 100 V or 220 V. The microprocessor controls the switching circuit so that the electric power being supplied to the boiling heater or the warming heater is kept constant without regard to the voltage of AC power.

In accordance with another aspect of the electric rice cookers in the present invention, there is a control device provided which is able to boil rice in two cooking modes to be defined later. Therefore, a mode selecting circuit is included.

In accordance with another aspect of the present invention, there is provided a controlling method of the electric rice cooker which comprises a step switching on and off the AC power supplied to the boiling heater so as to increase the temperature of the inner pot to the first predetermined temperature, a step disconnecting the supply of said AC power during the first predetermined interval which is required for the temperature of the inner pot to decrease from said first predetermined temperature to a second predetermined temperature, a step controlling said AC power so as to maintain the temperature of the inner pot at said second predetermined level during a second predetermined interval which is required for soaking rice, a step connecting said AC power to said boiling heaters so as to increase the temperature of the inner pot to a third predetermined level at which rice is boiled, a step disconnecting said AC power from said boiling heaters during a third predetermined interval, a step switching on and off said AC power being alternately connected to said boiling heaters and said warming heater during a fourth predetermined interval which is necessary to steam the boiled rice at a lower temperature, and a step supplying the AC power to said warming heater so as to maintain the inner pot at a fourth predetermined temperature.

BRIEF DESCRIPTION OF THE DRAWINGS

FIGS. 2(A) to 2(J) show flow charts for the operation of the control device of an electric rice cooker;

DETAILED DESCRIPTION OF THE PRESENT INVENTION

Figure 1:
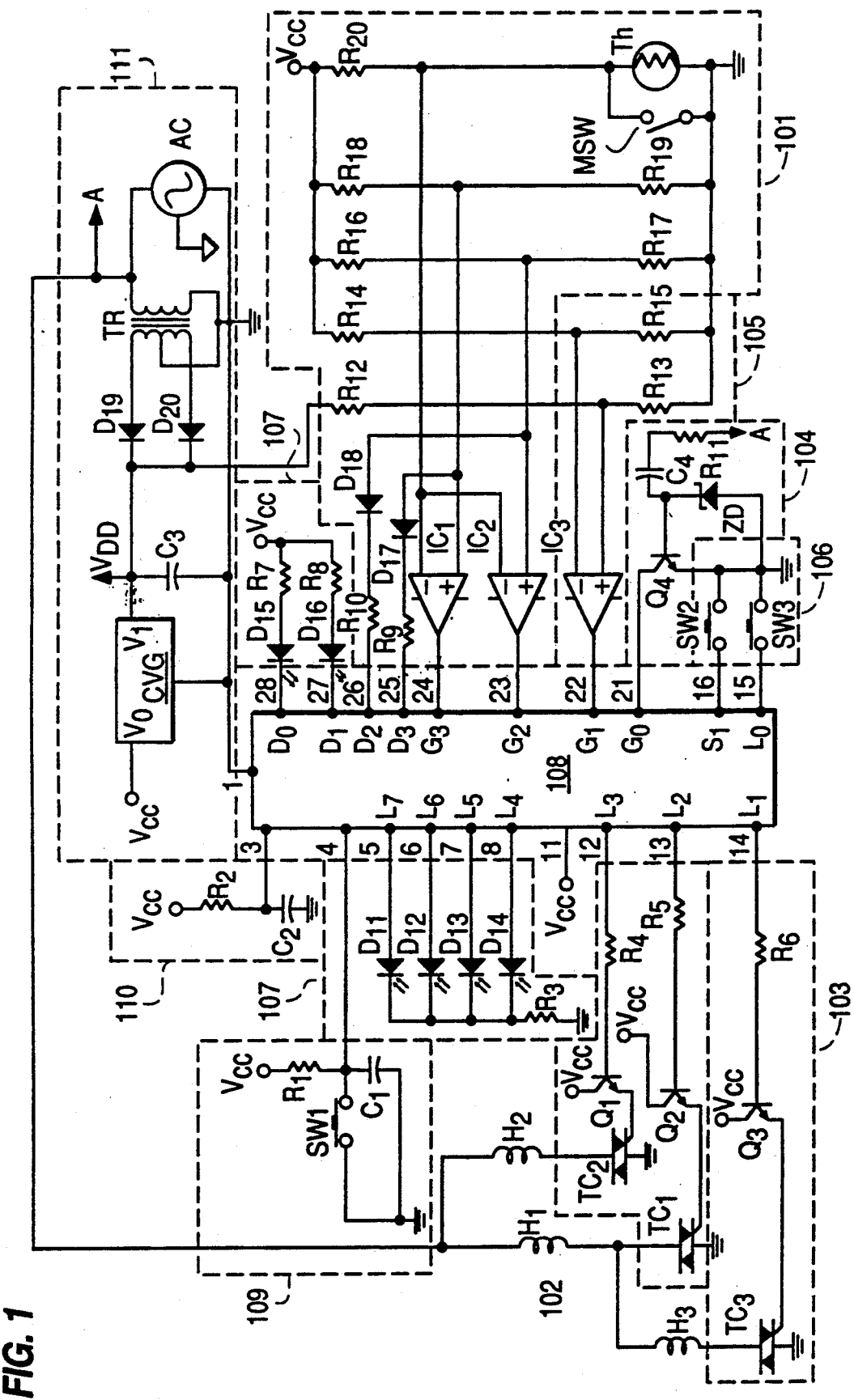
FIG. 1 shows an exemplary embodiment control device of an electric rice cooker according to the present invention.

Referring to the drawings, and more particularly to FIG. 1 thereof, a circuit diagram of a control device embodying the present invention is illustrated therein.

As shown in FIG. 1, a control circuit of an electric rice cooker according to the present invention comprises a temperature detecting circuit 101 for detecting the temperature of an inner pot of the electric rice cooker, a boiling heater switching circuit 102 for connecting boiling heaters to AC power, a warming heater switching circuit 103 for connecting a warming heater to AC power, a trigger signal generating circuit 104 to generate a trigger signal to trigger said switching means at the time synchronized with a zero-cross point of AC power, a voltage detecting circuit 105 for detecting the voltage of said AC power, a mode selecting circuit 106 for selecting a cooking mode, an indicator circuit 107 for indicating the state of the electric rice cooker, a microprocessor 108 which is connected with each of said circuits, and a reset circuit 109 which is used to manually reset the microprocessor or to drive the electric rice cooker into a warming mode when it is recovered from a power failure.

The temperature detecting circuit 101 which detects the temperature of the inner pot of the electric rice cooker includes a thermister Th and a resistor R20 connected in series therewith, two comparators IC1 and IC2 whose inverting input terminals are commonly connected in parallel with the thermistor Th, a first voltage divider including two resistors R18 and R19 whose output points are connected to the noninverting input terminal of comparator IC1, a second voltage divider including resistors R16 and R17 whose output points are connected to the noninverting input terminal of comparator IC2, a first temperature setting circuit including a series connection of diode D17 and resistor R9 in which anode of diode D17 is connected with the noninverting input terminal of comparator IC1 and one terminal of resistor R9 is connected to terminal D3 of microprocessor 108, a second temperature setting circuit including a series connection of diode D18 and resistor R10 in which anode of diode D18 is connected with the noninverting input terminal of comparator IC2 and one terminal of resistor R10 is connected to terminal D2 of microprocessor 108.

The output terminals of comparators IC1 and IC2 are connected to terminals G3 and G2 of microprocessor 108, respectively.

The resistance of resistors R10, R16, R17, R20 and thermistor Th is so selected that the output of comparator IC2 is inverted when the output from terminal D2 is logic 0 and the temperature of the inner pot is 160° C. or when the output is logic 1 and the temperature is 50° C.

The resistance of resistors R9, R18, R19, R20 and thermistor Th is so selected that the output of comparator IC2 is inverted when the output from terminal D3 is logic 0 and the temperature of the inner pot is 140° C. or when the output is logic 1 and the temperature is 70° C.

Therefore, temperature detecting circuit 101 can determine the temperature of the inner pot at intervals defined by two comparators and two temperature setting circuits. There are two boiling heaters H1 and H2 to be controlled by the control circuit of the electric rice cooker in the present invention.

Boiling heater switching circuit 102 includes two triacs TC1 and TC2 connected in series with boiling heaters H1 and H2, respectively, two transistors Q1 and Q2 whose emitters are connected to the gates of triacs TC1 and TC2, respectively, and whose bases are connected to terminals L3 and L2 of microprocessor 108 through resistors R4 and R5, respectively. Two boiling heaters H1 and H2 are so controlled that the thermal energy generated by the boiling heaters is constant without regard to the voltage of AC power. If the voltage of said AC power is 100 V, microprocessor 108 outputs logic 1 to the terminals L3 and L2. Two triacs TC1 and TC2 are gated on through transistors Q1 and Q2 because the transistors Q1 and Q2 are turned on by the signal of terminal L3 and L2. Therefore, two boiling heaters are energized by 100 V AC power and generate thermal energy corresponding to their capacity, i.e., 850 Watts.

If the voltage of AC power is 220 V, microprocessor 108 outputs logic 1 to terminal L3. Only one triac TC2 is gated on and boiling heater H2 is energized by 220 V AC power. However, the thermal energy generated from heater H2 having 220 V AC power is equal to that generated from the two heaters having 100 V AC power. Thus, the boiling heaters controlled by the control circuit of the electric rice cooker in the present invention generate a constant thermal energy without regard to the voltage of AC power, and the electric rice cooker can be adapted to a combined use of 100 V/200 V AC power.

Warming heater switching circuit 103 includes heater H3, triac TC3 connected in series with heater H3, transistor Q3 whose emitter is connected to the gate of triac TC3 and whose base is connected to terminal L1 of microprocessor 108 through resistor R6. If the voltage of AC power is 100 V, microprocessor 108 outputs a signal to terminal L1 and this signal turns on the gate of triac TC3 through transistor Q3. If triac TC3 is turned on, 100 V AC power is supplied to warming heater H3 and the temperature of the inner pot maintains a predetermined level to keep the pot warm.

If the voltage of AC power is 220 V, microprocessor 108 outputs a signal to terminal L1 at every 5 cycles of AC power. Therefore, triac TC3 can be turned on for one cycle of every 5 cycles of said AC power, and the thermal energy converted from 220 V AC power is the same as that from 100 V AC power.

Trigger signal generating circuit 104 includes transistor Q4 whose collector is connected to terminal G0 of microprocessor 108 and whose base is connected to AC power through a series combination of resistor R11 and capacitor C4, and zener diode ZD connected between the base of transistor Q4 and ground.

A square pulse is presented across zener diode ZD during a positive half cycle of AC power. So, the square pulse is synchronized with a zero-crossing point of AC power. This synchronized pulse is used to trigger said switching circuits 102 and 103 at the zero-crossing point of AC power.

Voltage detecting circuit 105 includes a first voltage divider including resistors R14 and R15, a comparator IC3 whose inverting input terminal is connected to the first voltage divider, and a second voltage divider including resistors R12 and R14 whose output signals are applied to the noninverting input terminal of comparator IC3. The output voltage of the first voltage divider is fixed, but the output voltage of the second voltage divider is proportional to the voltage of AC power. The output of comparator IC3 is applied to terminal G1 of microprocessor 108.

Voltage detecting circuit 105 is so designed that the output of comparator IC3 is logic 0 when the voltage of AC power is 100 V, and logic 1 when the voltage of AC power is 220 V. Mode selecting circuit 106 to define a cooking state of the electric rice cooker includes two switches SW2 and SW3. Switch SW2 is connected between terminal S1 of microprocessor 108 and ground, and switch SW3 is connected between terminal L0 of microprocessor 108 and ground. These two switches define two cooking modes of an electric rice cooker. Mode 1 is the cooking state of both boiling rice and steaming the boiled rice. Mode 2 is the cooking state of soaking rice in water, boiling the soaked rice, and steaming the boiled rice.

Indicator circuit 107 includes light emitting diodes (LED) D11, D12, D13 and D14 whose cathodes are connected in common therewith, resistor R3 connected between the cathodes of LED's and ground as a current limiter, light emitting diodes D15 and D16, and resistors R7 and R8 connected in series with diodes D15 and D16, respectively. The anodes of diodes D11, D12, D13 and D14 are connected to terminals L7, L6, L5 and L4 of microprocessor 108, respectively. The cathodes of diodes D15 and D16 are connected to terminals D0 and D1 of microprocessor 108, respectively. When the electric rice cooker operates in Mode 1, microprocessor 108 drives diode (LED) D11 to be illuminated. If the electric rice cooker operates in Mode 2, then microprocessor 108 drives diode (LED) D12 to be illuminated.

Steaming indicator D13 included in the indicator circuit 107 is a light emitting diode to indicate that the electric rice cooker is in the process of steaming the boiled rice. 220 V indicator D14 included in the indicator circuit 107 is a light emitting diode to indicate that the voltage of the AC power is 220 V, and 100 V indicator D15 included in the indicator circuit 107 is a light emitting diode to indicate that the voltage of the AC power is 100 V.

Warming indicator D16 included in the indicator circuit 107 is a light emitting diode to indicate that the electric rice cooker is warming the steamed rice. Each LED in the indicator circuit 107 is driven by the signal outputted from microprocessor 108 according to the cooking state of the electric rice cooker.

Reset circuit 109 includes switch SW1, capacitor C1 which is connected in parallel with switch SW1, and resistor R1 connected in series with a parallel combination of switch SW1 and capacitor C1. The voltage across the capacitor C1 is applied to terminal 4 of microprocessor 108. Microprocessor 108 is a type of COM 420L and available from National Semiconductor Co., USA.

FIGS. 2A to 2J show flow charts of the program for the functional operation of a control device according to the present invention.

Microswitch MSW being opened when the inner pot is put within the electric rice cooker is connected in parallel with thermistor Th.

Therefore, the microswitch enables the inner pot to be protected from being overheated when the inner pot is put within the electric rice cooker under the condition that AC power is supplied to the heaters and the mode selecting switches are activated.

Block 110 is to initially reset microprocessor 108, and block 111 is a voltage regulator including constant voltage regulator IC chip CVG. Each of numerals 3 through 28 is a pin number of microprocessor 108.

The operational procedure of an electric rice cooker manufactured according to the present invention is as follows.

A. Mode selection

If AC power is connected to the electric rice cooker, DC voltages Vcc and Vdd are supplied to each portion of the control device.

Figure 2A:
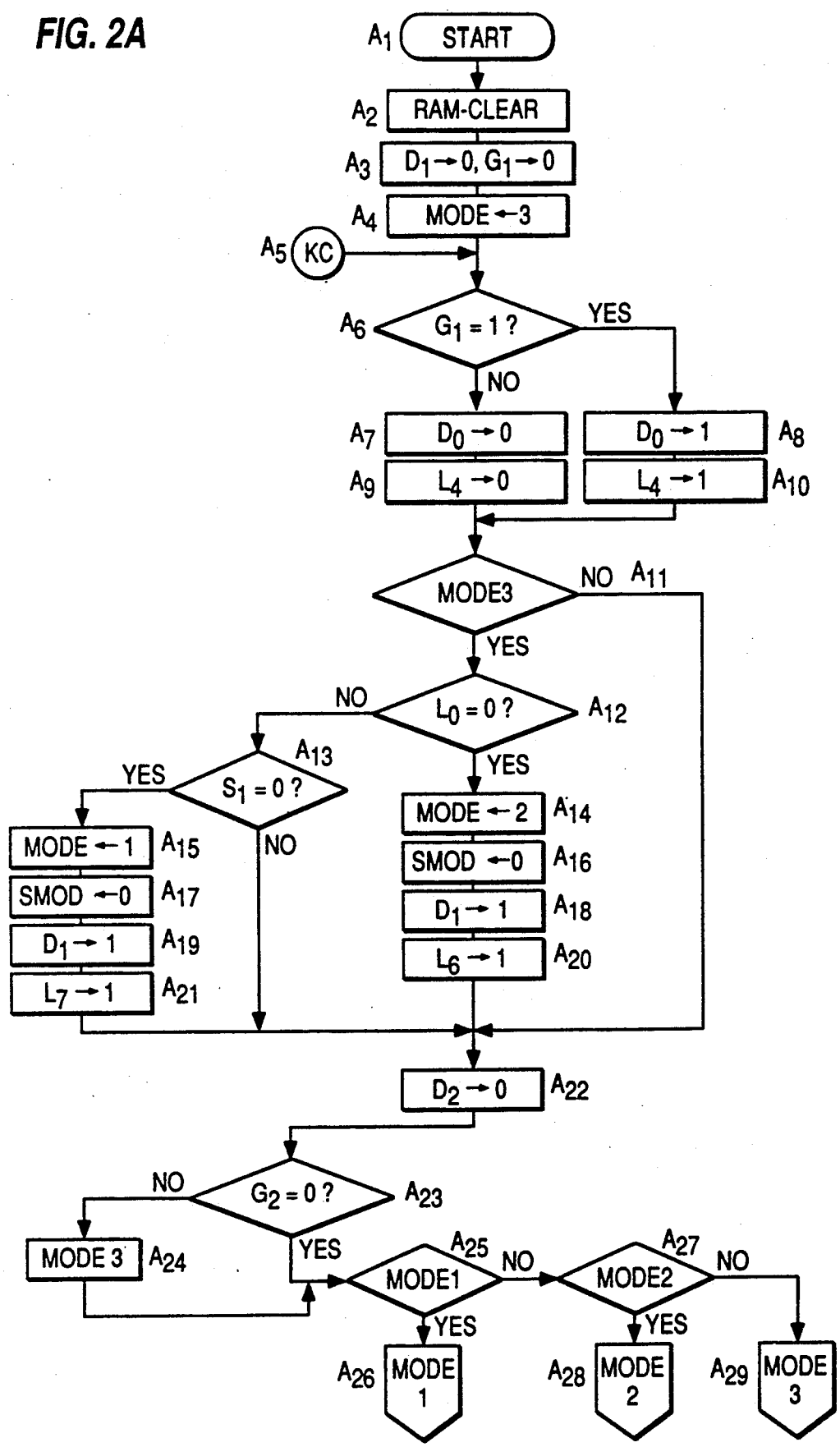
Figure 2F:
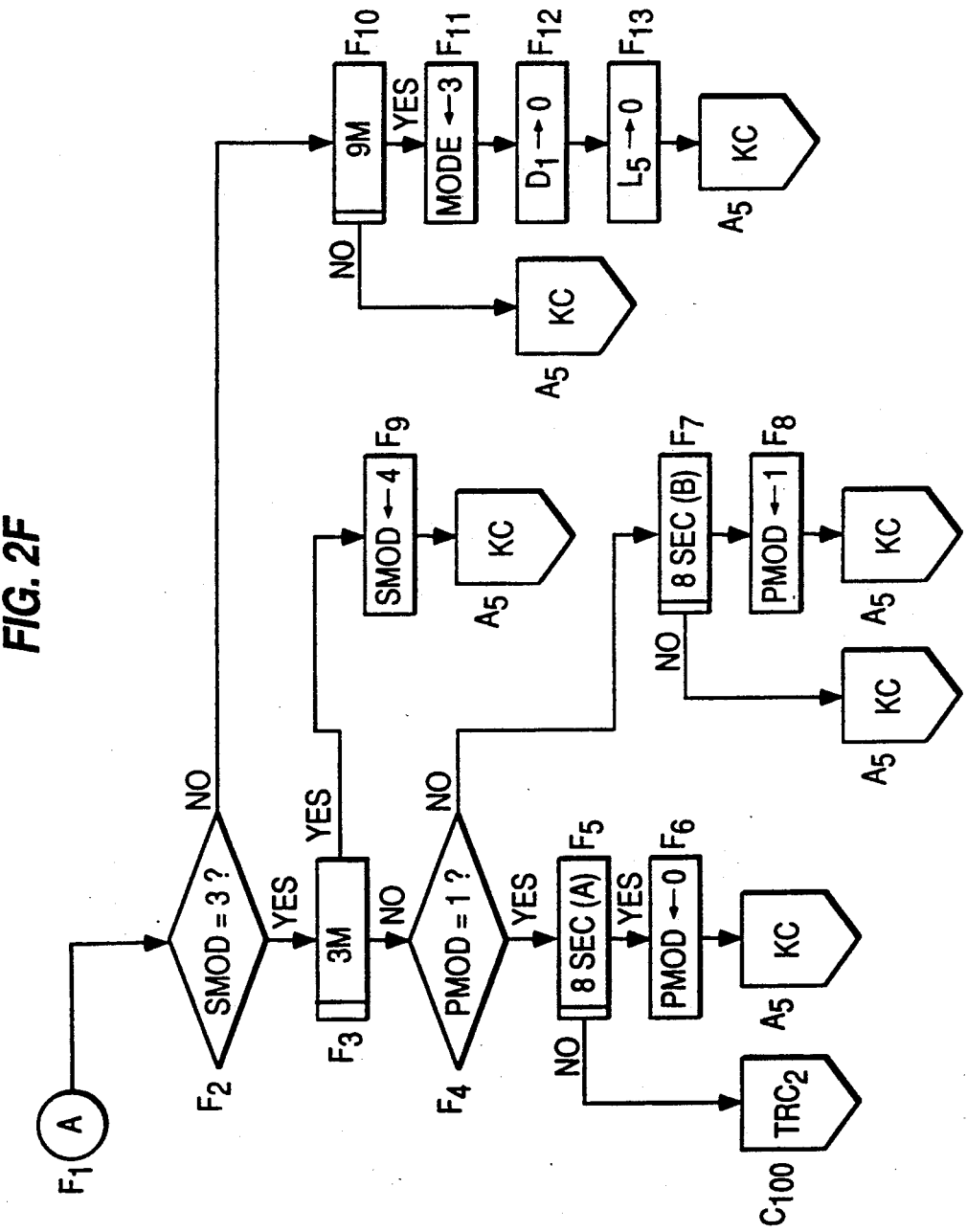

As shown in FIG. 2A, mode selection is done first. Starting with START step A1, step A2 is provided for initializing RAM of microprocessor 108. The program then proceeds to step A3 where microprocessor 108 outputs logic 0 to its terminal D1 and logic 1 to its terminal Go. This logic 0 illuminates indicator LED D16 which indicates that the cooker is in Mode 3 and maintains the temperature of the inner pot at a predetermined level for warming, i.e., 70° C., and said logic 1 of terminal Go makes microprocessor 108 generate synchronized pulse which is used to trigger switching circuits 102 and 103 at the zero-cross point of AC power.

The program, at step A4, stores 3 at memory MODE.

At step A6, the program decides whether or not the input to terminal G1 is logic 1 (which is corresponding to 220 V AC power). If yes, the program outputs logic 1 to the terminal D0 (step A8) and the terminal L4 (step A10). Because the logic output of terminal D0 is 1, indicator diode D15 for 100 V AC power is turned off. But the indicator diode D14 for 220 V AC power is illuminated because the logic level of terminal L4 is 1.

If the input to terminal G1 is not logic 1, the program proceeds to step A7 from step A6. At steps A7 and A9, microprocessor 108 outputs logic 0 to the terminals D0 and L4. This means that 100 V indicator diode D15 is illuminated and 220 V indicator diode D14 is turned off.

At step A11, the program determines if the content of memory MODE is 3. Because MODE is set with 3 at step A4, the program proceeds to step A12. If MODE is not 3, then the program jumps to step A22.

At step A12, the program determines whether or not the input to terminal L0 of microprocessor 108 is logic 0. If not, it means that the cooker is not in Mode 2. Therefore, the program proceeds to step A13 where the program determines if the input to terminal S1 is logic 0.

Because the logic 0 input to terminal S1 at step A13 means that the cooker is in Mode 1, the program proceeds to step A15. Microprocessor 108 stores 1 in memory MODE at step A15 and 0 in memory SMOD at step A17. Next, at steps A19 and A21, microprocessor 108 outputs logic 1 to the terminals D1 and L7 in order to illuminate both warming indicator D16 and Mode 1 indicator D11.

If the result at step A13 is false, then the program jumps directly to step A22.

If the result at step A12 is true, the electric rice cooker is in Mode 2. Therefore, the program proceeds to step A14 where memory MODE is set with 2. Memory SMOD is set with 0 at step A16. At steps A18 and A20, microprocessor 108 outputs logic 1 to terminals D1 and L6 so that mode 2 indicator diode D12 is illuminated and warming indicator diode D16 is turned off. Afterwards, the proceeds to step A22.

If the result at step A6 is false, the program jumps directly to step A22.

At step A22, microprocessor 108 outputs logic 0 to terminal D2 to set 160° C. as a predetermined temperature of the inner pot. At step A23, the program decides whether or not the input to terminal G2 is logic 0 which means that the temperature of the inner pot is lower than 160° C.

If yes, the program proceeds to step A25 to determine a cooking state. If not, because the temperature of the inner pot is higher than 160° C. which means that the electric rice cooker is in a malfunctioned state, the program proceeds to step A24 where memory MODE is set with 3.

Steps A25 to A29 are to determine what the cooking mode is.

B. Operation in Mode 1

If the switch SW2 is pressed to select Mode 1 in which a procedure of soaking rice is eliminated and the rice is boiled quickly, Mode 1 indicator diode D11 and one of AC power indicator diodes D14 or D15 are illuminated, and memory MODE is set with 1 and memory SMOD is set with 0, as described before. Afterwards, microprocessor 108 proceeds to step E2.

At step E2, the program determines whether logic 0 is stored in memory SMOD. If yes, the content of SMOD is changed to logic 1 at step E3, and the program jumps directly to step A5 and proceeds along the following sequence. When the program returns to step A11, SMOD is not 3 but 1. Therefore, the program jumps directly to step A22, and proceeds to step A23 from step A22. At step A23, the program determines again whether the temperature of the inner pot is lower than 160° C. When the program reaches step A25, 1 is stored in memory MODE. Therefore, the program proceeds to step A26 which is the same as step E1 from step A25. Because SMOD is set with 1, the program proceeds through steps E1, E2 and E4, and reaches step E5 where microprocessor 108 outputs logic 0 to terminal D3 so as to select 140° C. as a predetermined temperature for the temperature detecting circuit.

At step E6, the program determines if the input to terminal G3 of microprocessor 108 is logic 1. The temperature of the inner pot can not reach 140° C. because the boiling heaters are not yet connected to AC power. Therefore, the program proceeds to subroutine TRC1 from step E6.

Subroutine TRC1 of step D100 starts with a confirmation step D200 to determine whether AC power is 220 V or 100 V. At step D200, the voltage of AC power is determined by deciding if the input to terminal G1 of microprocessor 108 is logic 1.

If the voltage of AC power is 100 V, that is, the input to G1 is logic 0, then microprocessor 108 outputs logic 1 to terminals L2 and L3 (steps D300 and D400) to energize boiling heaters H1 and H2. Both boiling heaters are connected to 100 V AC power and generate the heat corresponding to their power capacity, i.e., 850 watts, the program jumps to step A5 and the following steps repeat themselves until the temperature of the inner pot rises to 140° C.

On the contrary, if the input to terminal G1 in subroutine TRC1 is logic 1, that is, the voltage of AC power is 220 V, then the program proceeds to step D500 from step D200 and microprocessor 108 outputs logic 1 to terminal L3. This logic 1 energizes boiling heater H2. As described before, the power consumption of boiling heater H2 when 220 V AC power is supplied is the same 850 watts as that of two boiling heaters H1 and H2 when 100 V AC power is supplied. Afterwards, the program proceeds to step A5, and the following sequence energizes boiling heater H2 until the temperature of the inner pot rises to 140° C.

If the temperature of the inner pot reaches 140° C., meaning, boiling rice is done, the input to terminal G3 changes to logic 1. Therefore, the program proceeds to operation step E7 where microprocessor 108 outputs logic 0 to terminal L7 and logic 1 to terminal L5 in order to illuminate steaming indicator diode D13 and turn off Mode 1 diode D11 (steps E7 and E8).

At step E9, the program stores 2 at memory SMOD and jumps to step A5. The following steps repeat themselves as before.

When the program reaches step E4, SMOD has already stored 2 instead of 1. Therefore, the program proceeds to the next confirmation step E11 and then to step E12.

The operation at step E12 is routine to determine if the loop including step E12 is executed for 3 minutes. If no, the program jumps directly to step A5 waiting 3 minutes without energizing the heaters. If the 3 minute routine is terminated, the program proceeds to step E13 from the routine of step E12.

A memory SMOD is set with 3 at step E13 and memory PMOD is set with 1 at step E14. After that, the program proceeds to step A5 and the following steps repeat themselves as before. When the program reaches step E11, SMOD has already been changed to 3. Therefore, the program proceeds to the next subroutine of step F1 from step E11.

Because SMOD stores 3, the program proceeds to a 3 minute routine of step F3 from step F2. If the loop including step F3 is executed for less than 3 minutes, the program proceeds to step F4 from step F3.

Because the content of memory PMOD is 1, the result of step F4 is true, and the program proceeds to step F5. The operation of step F5 includes an 8 second routine in order for microprocessor 108 to execute the loop including step F5 for 8 seconds without executing any new operation. If the 8 second routine is not terminated, the program jumps directly to subroutine TRC2 of step C100 where warming heater H3 is energized for the first 8 seconds.

Subroutine TRC2 starts with confirmation step C100 and determines at step C200 whether the voltage of AC power is 220 V or 100 V. If the input to terminal G1 is logic 0 meaning the voltage of AC power is 100 V, the program proceeds to step C300 where microprocessor 108 outputs logic 1 to terminal L1 so as to energize warming heater H3. If the result of step C200 is not true, the program proceeds to step C400. The operation of step C400 is a mod-5 counter which outputs a pulse every 5 cycles of 220 V AC power. Step C500 is to output a logic 1 to the terminal L1 of microprocessor 108 at every 5 cycles of 220 V AC power according to the pulse from step C400. Therefore, microprocessor 108 energizes warming heater H3 for 1 cycle at every 5 cycles of the 220 V AC power so that the heat generated by warming heater H3 is maintained at a constant temperature for 8 seconds without regard to the voltage of the AC power, whether it is 220 V or 100 V.

If the 8 second routine is terminated at step F5, the program proceeds to step F6 where a memory PMOD is set with 0. Afterwards, the program proceeds to step A5 and the following steps repeat themselves.

When the program reaches step F4, the content of PMOD is not 1 but 0. Therefore, the program proceeds to another 8 second routine at step F7. The program jumps directly to step A5 without energizing the heaters until the 8 second routine at step F7 is terminated.

If the routine of step F7 is terminated, the program proceeds to step F8 where the memory PMOD is set with 1.

When the program proceeds along the following steps and reaches step F4, the content of PMOD is 1 instead of 0. Therefore, the program proceeds to step F5 to energize the heater for 8 seconds.

Thus, the procedure for energizing the heater for 8 seconds as defined at step F5 and deenergizing it for the following 8 seconds as defined at step F7 repeats itself for 3 minutes as defined at step F3.

If the 3 minute routine at step F3 is terminated, the program proceeds to step F9 where SMOD is set with 4 and jumps to step A5. When the program reaches step F2, the content of memory SMOD is 4 instead of 3, the program then proceeds to step F10. Step F10 includes a 9 minute routine which determines if the loop including the direct jump from step F10 to step A5 is executed for 9 minutes. If not, the program jumps directly to step A5 to continue steaming the boiled rice.

If the 9 minute routine of step F10 is terminated, the program proceeds to step F11 where memory MODE is set with 3.

At steps F12 and F13, microprocessor 108 outputs logic 0 to terminals D1 and L5. These output signals illuminate warming indicator diode D15 and turn off steaming indicator diode D13. Afterwards, the program proceeds to step A5 to drive the electric rice cooker to mode 3 which keeps the rice warm.

Figure 3A:
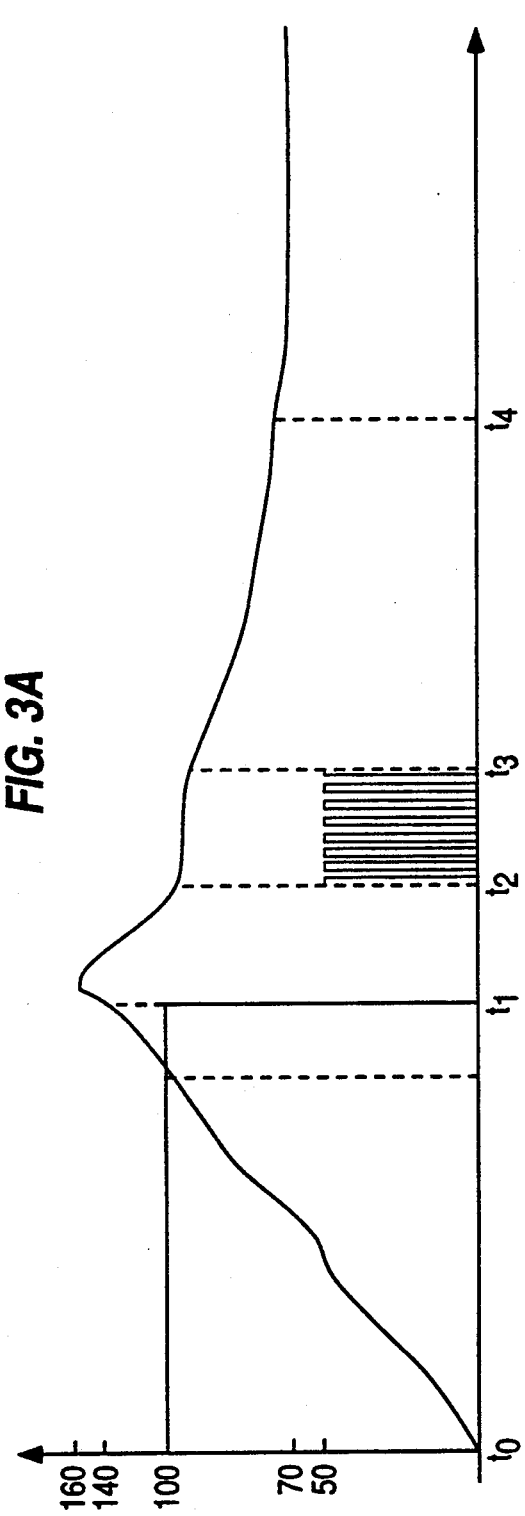
FIG. 3(A) shows variations of the power consumption and temperature of the inner pot when an electric rice cooker is controlled by the control device of the present invention in Cooking Mode 1.

Thus, steaming the boiled rice is continued for 15 minutes. The variation of power consumption and the variation of temperature of the inner pot are shown in FIG. 3A.

The interval between t0 and t1 is for boiling rice and the interval between t1 and t2 is a waiting state of 3 minutes after the rice is boiled.

The interval between t2 and t3 is 3 minutes for switching on and off the AC power supplied to warming heater H3. The interval between t3 and t4 is a waiting state of 9 minutes. After t4, the electric rice cooker is kept at a constant temperature, i.e., 70° C. which is proper for keeping the inner pot warm.

Thus, the interval for steaming the boiled rice is 15 minutes defined between t1 and t4.

C. Operation in Mode 2

As described before, mode 2 is defined as a cooking state energizing the heaters to soak rice in water thoroughly, boil the soaked rice, and steam the boiled rice.

If switch SW2 in mode selecting circuit 106 is switched on, memory MODE is set with 2 at step A14 and mode 2 is selected when the program reaches step A27.

Figure 2G:
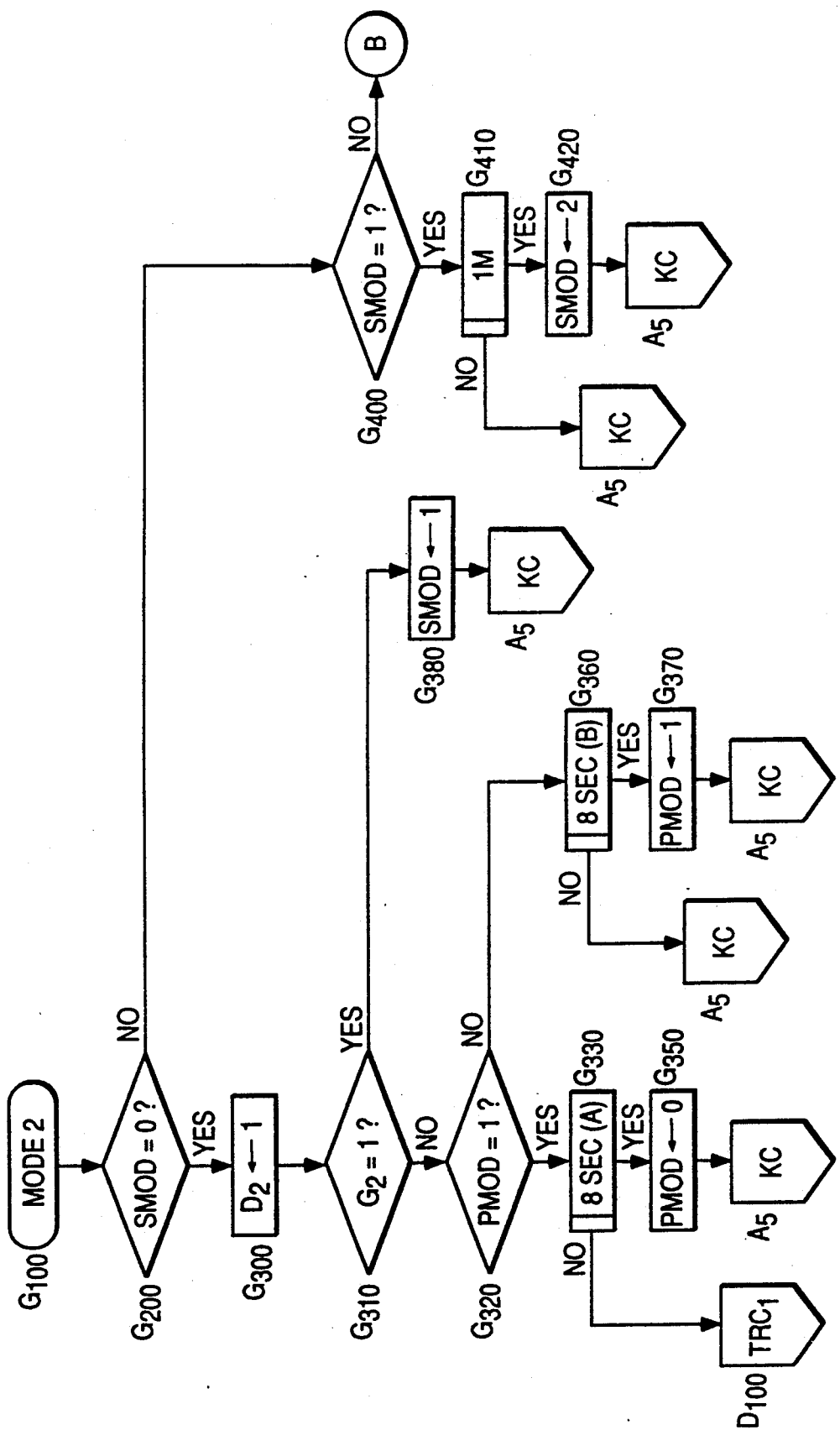
Figure 2H:
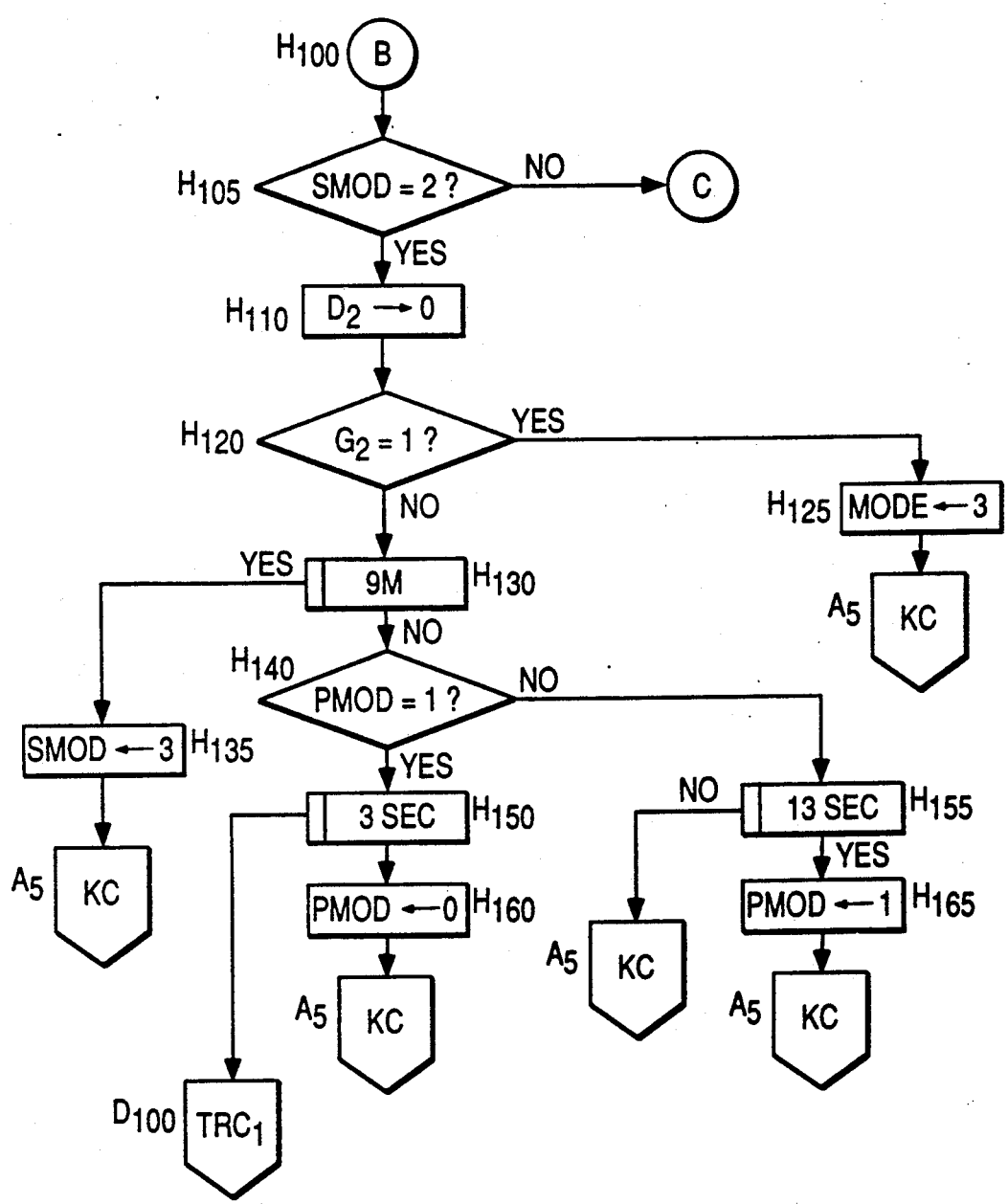
Figure 2J:
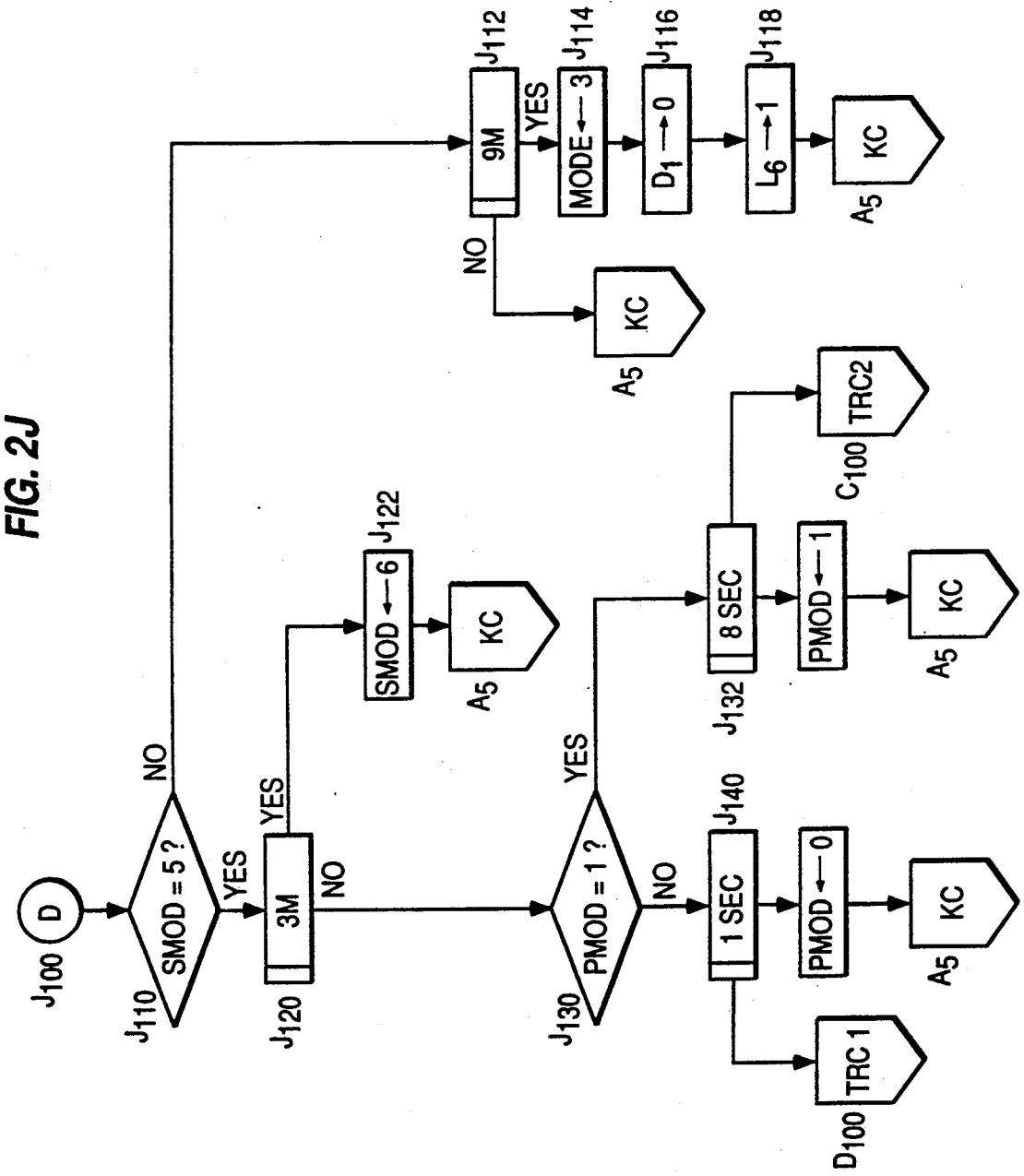

Therefore, the program proceeds from step A27 to step A28 which is equivalent to step G100 of FIG. 2G.

The procedure for mode 2 starts with step G200 where the program determines, whether the content of memory SMOD is 0. If the content is true, the program proceeds to step G300 where microprocessor 108 outputs logic 1 to terminal D2 and selects 50° C. as a predetermined temperature of temperature detecting circuit 101.

At step G310, the program determines whether the input to terminal G2 of microprocessor 108 is logic 1. If not, it means that the temperature of the inner pot is lower than 50° C., and as a result the program proceeds to the next confirmation step G320 where the program determines if the content of memory PMOD is 1.

If PMOD stores 1, the program proceeds to step G330 where the program determines whether an 8 second routine is terminated. If not, the program proceeds to TRC1 of step D100 so as to energize the heater, as in the case of mode 1. If the 8 second routine including step G330 is terminated, the program proceeds from step G330 to step G350 where the content of memory PMOD is set with logic 0 and jumps to step A5. When the program reaches step G320, the content of memory PMOD is 0 instead of 1, therefore, the program proceeds from step G320 to step 360 which is another 8 second routine for deenergizing the heaters for 8 seconds. These two 8 second routines repeat themselves until the temperature of the inner pot reaches 50° C.

When the temperature of the inner pot reaches 50° C., the input to terminal G2 of microprocessor 108 is changed to logic 1. Therefore, the program proceeds from step G310 to step G380 where memory SMOD is set with 1, and jumps to step A5.

When the program reaches step G200, the content of memory SMOD is 1 instead of 0. Therefore, the program proceeds to step G400 from step G200, and to step G410 where the program includes a 1 minute routine for a waiting state.

If the 1 minute routine, which is a loop including step G410, is not terminated, the program jumps directly to step A5 from step G410. No heaters are energized during this 1 minute routine.

When the 1 minute routine is terminated, the program proceeds to step G420 where memory SMOD is set with 2, and jumps to step A5. The program proceeds along the following steps. When the prorgam reaches step G400, the content of memory SMOD is 2 instead of 1.

Therefore, the program proceeds to step H100.

When the program reaches step H100, the temperature of the inner pot reaches 50° C. which is the temperature suitable for the rice to be soaked.

At step H105, the program determines whether the content of memory SMOD is 2. If yes, the program proceeds to step H110 where microprocessor 108 outputs logic 0 to terminal D2.

At confirmation step H120, the program determines whether the input to terminal G2 is logic 1. If yes, it means that the cooker is malfunctioning, i.e., the temperature of the inner pot is higher than 160° C.

Therefore, the program passes to step H125 where memory MODE is set with 3 in order for the cooker to be in mode 3. After that, the program jumps to step A5 to make a loop in which the electric rice cooker in mode 3 is disconnected from AC power.

Thus, the electric rice cooker is protected from trouble, for example, a fire.

On the contrary, if the input to terminal G2 at step H120 is not logic 1, the program proceeds to step H130 where a 9 minute routine is included.

When the program reaches step H130, the program determines if the routine is terminated. If not, it is repeatedly executed for 9 minutes alternately connecting AC power to the heaters for 3 seconds and disconnecting AC power for 13 seconds along the loop including steps H140, H150, H160, H155 and H165.

As a result of this repetition, the temperature of the inner pot, which is suitable for soaking rice, is maintained. If the 9 minute routine is terminated, the program proceeds step H135. The program at step H135 sets memory SMOD with 3 and jumps to step A5. When the program reaches step H105, the content of memory SMOD is 3.

Therefore, the program proceeds to step I110 where the program determines whether SMOD is 3 through step I100. Because the content of the memory SMOD is 3, microprocessor 108 outputs logic 0 to terminal D3 (step I120) and proceeds to step I130.

At step I130, the program determines whether the input to terminal G3 is logic 1. If not, the program jumps to step D100 so that AC power is supplied to the heaters by the loop including subroutine TRC1, and boiling rice is done correctly by the heat converted from 850 watts.

When boiling rice is terminated and water in the pot is exhausted, the temperature of the inner pot will abruptly rise up over 140° C. Then, logic 1 is inputted to the temrminal G3 of microprocessor 108. Therefore, if the program reaches step I130, the program proceeds to step I140 from step I130.

At steps I140 and I150, microprocessor 108 outputs logic 0 to terminal L6 and logic 1 to terminal L5.

As a result, boiling indicator diode D12 is turned off and steaming indicator diode D13 is illuminated.

At step I160, the content of memory SMOD is changed to 4 from 3. Afterwards, the program jumps to step A5. When the program reaches step I110, the program proceeds to step 112, because the confirmation at step I110 reads in the negative.

Because the content of memory SMOD is 4, the program proceeds to step I114 from step I112 and then jumps to step A5. The program proceeds along the loop including step I114 until the 3 minute routine at step I114 is terminated.

During the 3 minute routine, the boiling heaters are not energized, and the temperature of the inner pot decreases gradually allowing the boiled rice to steam.

When the 3 minute routine is terminated, the program proceeds to step I116 in which microprocessor 108 sets memory SMOD with 5. Afterwards, the program jumps to step A5.

When the program returns to step I112, the program proceeds to step J100 because the content of memory SMOD is not 4 but 5.

The program determines at step J110 whether SMOD is 5. If yes, the program proceeds to step J120.

At step J120, the program determines if the 3 minute routine is terminated. If not, it proceeds repeatedly along the loop including steps J130, J140 and subroutine TRC1 to energize the boiling heaters for 1 second, and a loop including steps J130, J132 and subroutine TRC2 to energize the boiling heaters for 8 seconds. During the 3 minute routine, steaming of the boiled rice is done correctly at a low temperature.

Because the time energizing the warming heater is one eighth of the time energizing the boiling heaters, the temperature of the inner pot is a little higher than when it is heated by the warming heater alone. Therefore, the temperature for steaming the boiled rice is a little higher than the 70° C. warming temperature. The variation of this temperature corresponds to the interval between t6 and t7 in FIG. 3B, where the variation is decreased by a gradual slope to the warming temperature.

If 3 minute delay routine at step J120 is terminated, the program proceeds to step J122 where SMOD is set with 6.

Afterwards, the program jumps to step A5 and proceeds to the following steps.

When the program reaches step J110, SMOD is not 5. Therefore, the program proceeds to step J112 in which a 9 minute routine is included.

When the program reaches step J112, the program determines if the 9 minute routine is terminated. If not, the program jumps to step A5 and proceeds along the loop without energizing the warming and boiling heaters.

Therefore, the temperature of the pot is lowered gradually and steaming of the boiled rice is done correctly. If the 9 minute routine at step J112 is terminated, the program proceeds to step J114 where MODE is set with 3. Microprocessor outputs logic 0 to terminals D1 [step J116] and L5 [step J118].

These two at logic 0 turn off both the warming indicator lamp and steaming indicator lamp which indicates the termination of boiling.

Figure 3B:
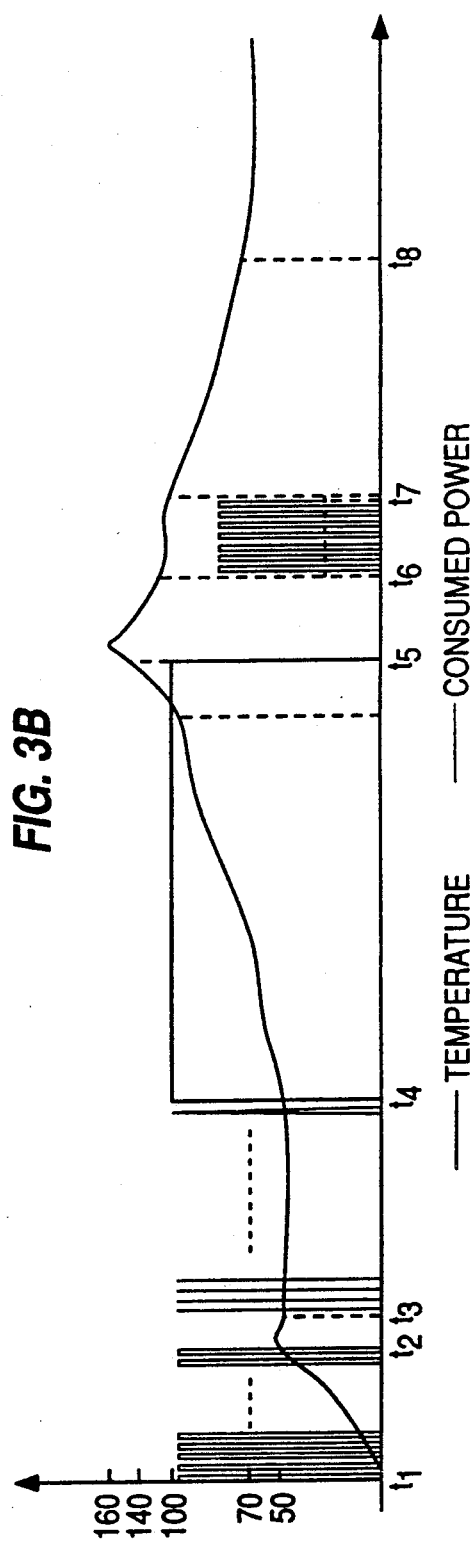
FIG. 3(B) shows variations of the power consumption and temperature of the inner pot when an electric rice cooker is controlled by the control device of the present invention in Cooking Mode 2.

The variations of the temperature and power consumption of the inner pot during cooking are shown in FIG. 3B.

The interval between t1 and t2 is to increase the temperature of the pot, enough to soak the rice properly. For 1 minute between t2 and t3, the temperature of the pot rises a little higher than the proper temperature for soaking but, lowers gradually to the proper temperature.

The time between t3 and t4 is 9 minutes for which soaking the rice is done at a constant temperature. For the time interval between t4 and t5 the rice is boiled with constant power.

The temperature of the inner pot lowers at a slow slope and steams the boiled rice for 3 minutes between t5 and t6. The interval between t6 and t7 is the 3 minutes extended by the present invention in order for boiled rice to be steamed while the slope of the temperature variation is kept extremely slow.

For 9 minutes between t7 and t8, AC power is disconnected from all heaters and the temperature of the entire pot is decreased at a slow slope while steaming of the boiled rice continues.

D. Operation in Mode 3

This mode maintains the constant temperature of the inner pot at a proper level for keeping the pot warm.

This mode has a function to prevent the electric rice cooker from overheating caused by a malfunction.

Mode 3 is executed by one of three operations. First, it is automatically selected by a termination of cooking, as decribed before. Second, microprocessor 108 selects mode 3 when reset circuit 109 is operated by a recovery from power failure, as described in conjunction with FIG. 2A.

Third, it is executed when the temperature of the inner pot suddenly rises up over 160° C. due to a malfunction.

If mode 3 is selected, as shown in FIG. 2B, microprocessor 108 outputs logic 1 to terminal D3 [step B2] in order for 70° C. of the pot temperature to be detected by temperature detecting circuit 101. Microprocessor 108 determines at step B3 if the input terminal G3 is logic 1. If yes, the program jumps to step A5 and repeats the following loop until the temperature of inner pot drops below 70° C. If the temperature of the pot is below 70° C. and the input to terminal G3 is not logic 1, the program proceeds to subroutine TRC2 of step C100 to connect AC power to the warming heater.

With the arrangement as previously stated, the present invention has remarkable practical effects. While the present invention has been described with reference to the preferred embodiments shown in the drawings, it should be understood that the invention is not limited to those embodiments but includes several other possible modifications, alterations and equivalent arrangements within the scope of appended claims.

What is claimed is:

1. A control device for an electric rice cooker, comprising:
   temperature detecting means for detecting the temperature of the inner pot of the electric rice cooker;
   first heater switching means for connecting AC power to a first heater to soak rice in the pot at a first predetermined temperature;
   second heater switching means for connecting AC power to a second heater to boil rice in the pot;
   third heater switching means for connecting AC power to a third heater to keep the boiled rice warm at a second predetermined temperature;
   trigger signal generating means for generating a trigger signal by which said boiling heater switching means and said warming heater switching means are synchronously triggered at a zero cross point of the AC supply voltage; and
   a microprocessor responsive to said temperature detecting means, said second heater switching means, said third heater switching means, and said trigger signal generating means, said microprocessor having a program stored to control said second heater switching means and said third heater switching means.

2. The control device according to claim 1, wherein each of said switching means includes a circuit to decide whether the voltage of said AC power is 220 V or 100 V, and said microprocessor controls each of said switching means so as to supply a constant power to each of said heaters without regard to the different voltages of said AC power.

3. The control device according to claim 1, further comprising mode selection means for selecting either a first cooking mode or a second cooking mode, said first mode having a first sequence of boiling rice, steaming the boiled rice and warming the steamed rice and said second mode having a sequence of soaking the rice in water, boiling the soaked rice, steaming the boiled rice and warming the steamed rice.

4. The control device according to claim 1, wherein said temperature detecting means comprises a circuit including:
   a thermistor and a first resistor connected in series;
   first and second comparators having inverting input terminals commonly connected in parallel with the thermistor and having output terminals connected to input terminals of said microprocessor;
   a first voltage divider including third and fourth resistors having an output point connected to a noninverting input terminal of said first comparator;
   a second voltage divider including fifth and sixth resistors having an output point connected to a noninverting input terminal of said second comparator;
   a first temperature setting circuit including a series connection of a first diode and a seventh resistor in which an anode of said first diode is connected with the noninverting input terminal of said first comparator and one terminal of said seventh resistor is connected to a first output terminal of microprocessor; and
   a second temperature setting circuit including a series connection of a second diode and an eighth resistor in which an anode of said second diode is connected with the noninverting input terminal of said second comparator and one terminal of said eighth resistor is connected to a second output terminal of microprocessor.

5. The control device of an electric rice cooker according to claim 1, wherein said first heater switching means and said second heater switching means are the same.

6. The control device of an electric rice cooker according to claim 1, wherein said first heater and said second heater are the same.

7. A control method for supplying power to an electric rice cooker, comprising the steps of:

a first switching step for switching "on" and "off" repeatedly an AC power supplied to first heating means so that a temperature of an inner pot of the rice cooker is increased in a slow slope;

a first disconnecting step for disconnecting said AC power from said first heating means during a first predetermined interval required for the temperature of said inner pot to decrease from said first predetermined temperature to a second predetermined temperature;

a second switching step for switching "on" and "off" repeatedly said AC power of said first heating means so as to maintain a constant temperature of the inner pot during said second predetermined interval;

a connecting step for connecting said AC power to said first heating means without an interval so as to increase the temperature of the inner pot to a third predetermined temperature;

a second disconnecting step for disconnecting said AC power from said first heating means during said third predetermined interval;

a third switching step for switching "on" and "off" said AC power alternately connected with said first heating means and a second heating means; and a controlling step for controlling said AC power connected to said second heating means so as to maintain the temperature of the inner pot at a fourth predetermined temperature.

8. The control method according to claim 7, wherein said second switching step allows the rice to soak in the water at said second predetermined temperature during said second predetermined interval.

9. The control method according to claim 7, wherein said third predetermined temperature is a temperature at which the rice is boiled.

10. The control method according to claim 7, wherein said fourth predetermined temperature is a temperature at which the boiled rice is warmed.

* * * * *